United States Patent [19]
Wadell

[11] Patent Number: 5,186,089
[45] Date of Patent: Feb. 16, 1993

[54] APPARATUS AND PROCESS FOR CUTTING FOODSTUFFS

[75] Inventor: Lars G. A. Wadell, Aengelholm, Sweden

[73] Assignee: Nestec S.A., Vevey, Switzerland

[21] Appl. No.: 596,697

[22] Filed: Oct. 12, 1990

[30] Foreign Application Priority Data

Nov. 25, 1989 [EP] European Pat. Off. ........ 89122139.2

[51] Int. Cl.⁵ .............................................. B26D 7/30
[52] U.S. Cl. ......................................... 83/56; 83/76.8; 83/368; 83/435
[58] Field of Search .................. 83/76.8, 77, 435, 932, 83/498, 732, 56, 364, 360, 363, 368

[56] References Cited

U.S. PATENT DOCUMENTS

| | | | |
|---|---|---|---|
| 4,136,504 | 1/1979 | Wyslotsky | 53/435 |
| 4,441,537 | 4/1984 | Vartiainen | 144/357 |
| 4,598,618 | 7/1986 | Kuchler | 83/77 |
| 4,603,610 | 8/1986 | Whitehouse | 83/13 |
| 4,718,146 | 1/1988 | Adkison | 17/52 |
| 4,831,909 | 5/1989 | Peters et al. | 83/425.4 |
| 4,947,517 | 8/1990 | Boekel | 17/1 R |
| 4,960,023 | 10/1990 | Reuter et al. | 83/368 |
| 5,031,493 | 7/1991 | Dorr | 83/13 |

FOREIGN PATENT DOCUMENTS 0288592 11/1988 European Pat. Off. ................ 83/77

Primary Examiner—Mark Rosenbaum
Assistant Examiner—John M. Husar
Attorney, Agent, or Firm—Vogt & O'Donnell

[57] ABSTRACT

Foodstuffs are transported on a conveyor to a cutting device which is actuated to move into a position for cutting and then cut the transported foodstuffs into portions. An ultrasonic measuring device takes foodstuff length and thickness information from the foodstuff transported by the conveyor to the cutting device. The information taken by the ultrasonic measuring device is fed to a control unit which processes the information and actuates the cutting device to move into a position to cut the foodstuff and then to cut the foodstuff into portions.

10 Claims, 2 Drawing Sheets

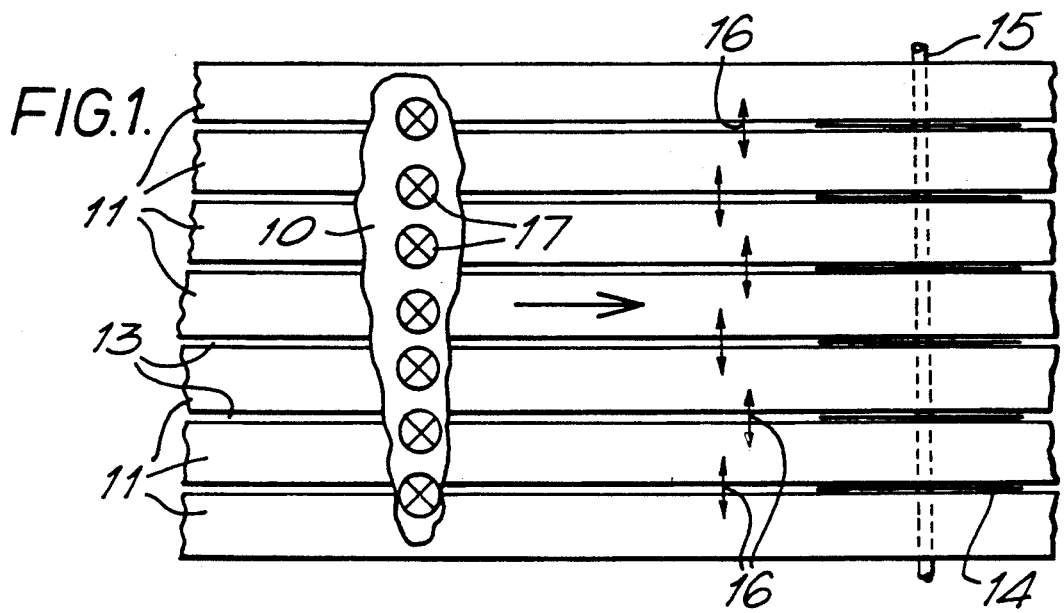
FIG. 1.
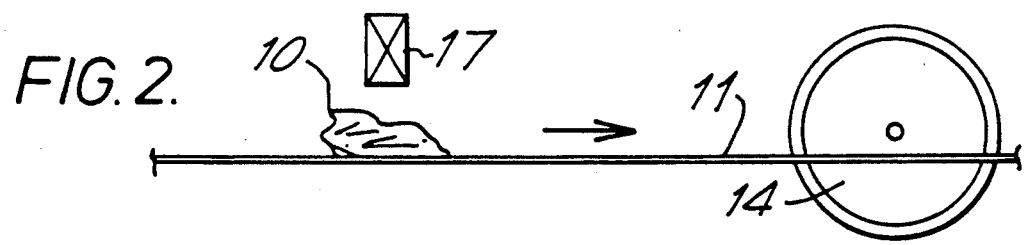
FIG. 2.
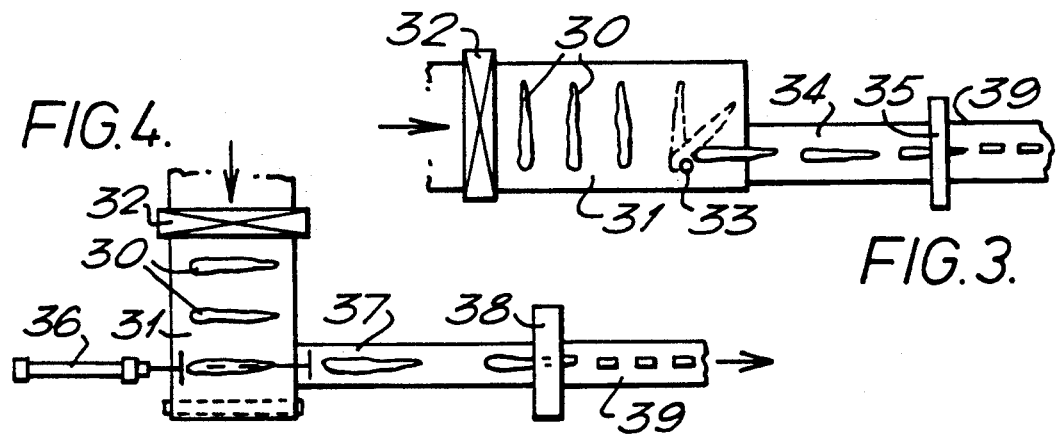
FIG. 4.
FIG. 3.
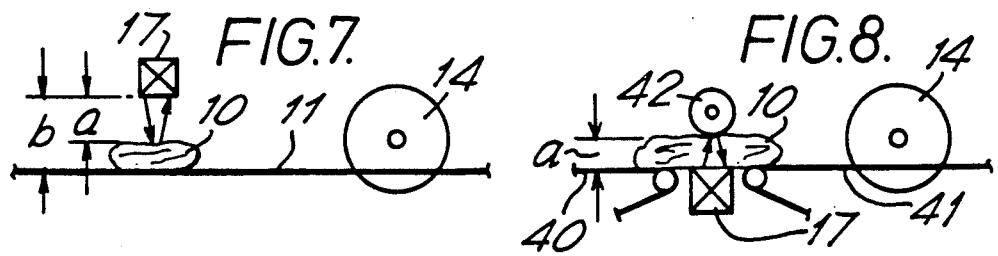
FIG. 7.    FIG. 8.

APPARATUS AND PROCESS FOR CUTTING FOODSTUFFS

BACKGROUND OF THE INVENTION

The present invention relates to automatically measuring and cutting foodstuffs.

The cutting of fish portions is often carried out these days by apparatus which comprise weighing machines. However, the weighing machines employed are usually mechanically complex and space consuming.

SUMMARY OF THE INVENTION

We have now devised a method and an apparatus for measuring and cutting foodstuffs which are mechanically simple and space saving.

Accordingly, the present invention provides an apparatus for the automatic measuring and cutting of foodstuffs to produce portions of a predetermined size or weight comprising a conveyor for transporting the foodstuffs in a downstream direction, an ultrasonic measuring device adapted to take information on the length and thickness of the foodstuffs as they are transported on the conveyor, a cutting device positioned downstream of the ultrasonic measuring device, and a control unit adapted to receive and process the information from the ultrasonic measuring device and then actuate the cutting of the foodstuffs by the cutting device into portions substantially equal to the predetermined size.

The present invention also provides a method for the cutting of foodstuffs wherein a foodstuff is transported on a conveyor past an ultrasonic measuring device which takes information on the length and thickness of the foodstuff. The information taken by the ultrasonic measuring device is fed to a control unit and then processed to actuate moving a cutting device into a position to cut the foodstuff transported on the conveyor and to actuate cutting the foodstuff into portions.

The present invention is especially suitable for cutting fish or meat, especially frozen fish fillets.

DETAILED DESCRIPTION OF THE INVENTION

In the present invention, the ultrasonic measuring device may comprise a plurality of sensors mounted above or below the conveyor the number of sensors being proportional to the length of the foodstuff. When the foodstuff passes beneath the sensors, each sensor measures a section of the foodstuff, the number of measurements taken being proportional to the size of the foodstuff and the requirements for weight accuracy. The measuring device records information on the section area, the belt speed, the length and the thickness at several points over the surface, and passes this information to the control unit. The section area is obtained by measuring the thickness of the foodstuff section in each section point, and the volume of each piece to be cut is calculated from the product of the section area and the length.

The control unit is preferably a computer and is preprogrammed for the specific gravity and the desired weight of the foodstuff portion. After receiving the information from the ultrasonic measuring device, the control device calculates the length needed for a given piece weight and then actuates the cutting of the foodstuffs, preferably by actuating the cutting device to move into the appropriate position to cut the foodstuff into the predetermined size.

The cutting device may comprise one or more circular knives or circular saws or stamps with sharp edges.

The conveyor may be a single belt or it may comprise a plurality of parallel belts mounted on common shafts with a spacing of, for instance, 10 to 40 mm, more usually from 20 to 30 mm between adjacent belts.

Conveniently, the belt speed may be from 6 to 20 meters per minute. The foodstuff may conveniently be transported past the measuring device transversely or longitudinally.

The cutters of the cutting device may be parallel or transverse to the direction of motion of the conveyor. When the cutters are parallel to the conveyor belts, they lie with their cutting edges in the gaps between the belts and they may be adapted to move laterally into the appropriate cutting position by conventional methods. However, the lateral motion is conveniently, steplessly automatic and may advantageously be controlled by pulse motors and forks. When the cutters are transverse to the conveyor belt or belts their cutting edges lie above the belt and descend to cut the foodstuff.

BRIEF DESCRIPTION OF THE DRAWINGS

The present invention is illustrated by way of example only with reference to the following drawings.

FIG. 1 is a diagrammatic top plan view of an apparatus in which a fish piece travels transversely along seven parallel conveyor belts with six cutting knives positioned in the gaps between and parallel to adjacent belts.

FIG. 2 is a diagrammatic side sectional view of FIG. 1.

FIGS. 3 and 4 are diagrammatic top plan views of apparatus in which fish fillets are measured while travelling transversely and then cut while travelling longitudinally.

FIGS. 7 and 8 are diagrammatic side sectional views showing the use of ultrasonic sensors for measuring thickness in two ways.

DETAILED DESCRIPTION OF THE DRAWINGS

Figure 6:
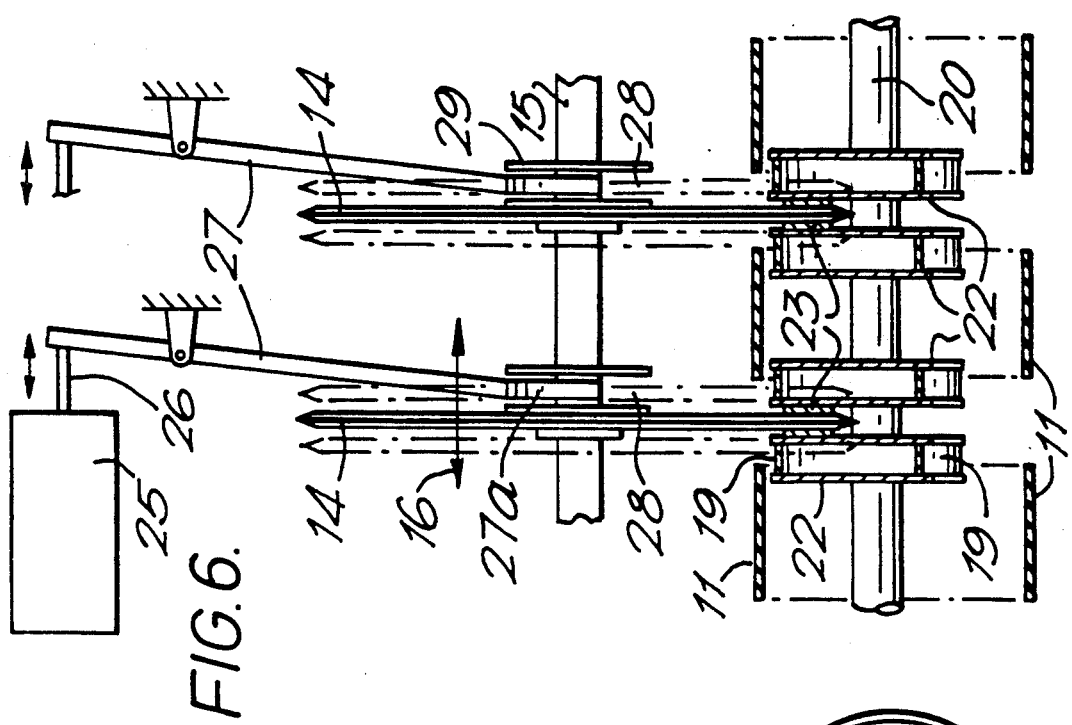
FIG. 6 is a sectional view along the line A—A in FIG. 5 looking in the direction of the arrows.
Figure 5:
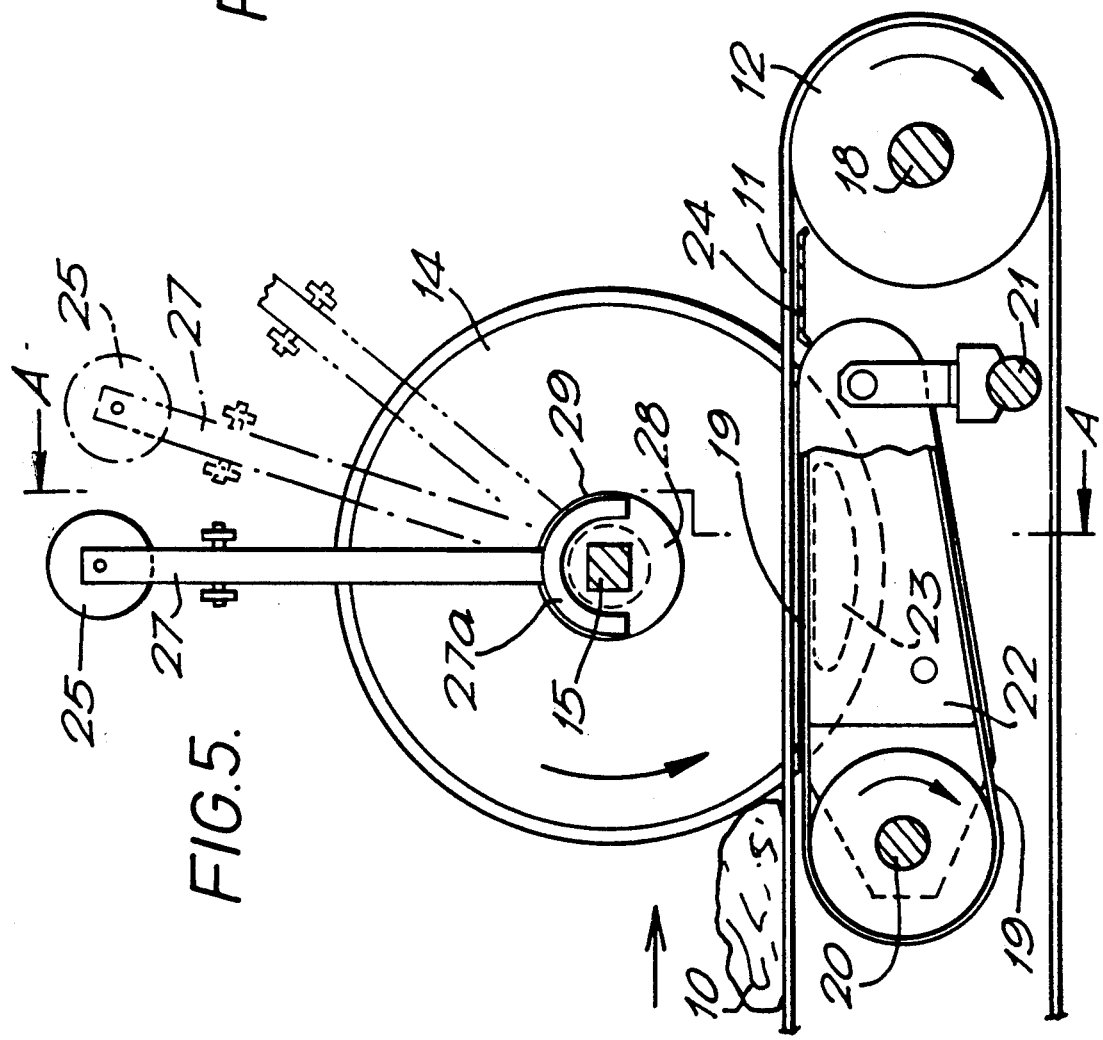
FIG. 5 is a detailed side sectional view of a cutting device of the apparatus of FIG. 1.

Referring to FIGS. 1, 2, 5 and 6 of the drawings, a loin 10 which is conical in shape, i.e., broader and thicker at one end, obtained from a cod fillet after the tail has been cut off and the belly flap removed, is positioned transversely across seven parallel conveyor belts 11 trained about rollers 12 separated by gaps 13 between which are positioned six circular cutting knives 14 on a drive shaft 15, each knife being capable of sliding on the drive shaft 15 with stepless adjustable transverse movements within the gaps 13 as indicated by the arrows 16. Positioned above and below the belts 11 are ultrasonic sensors 17. The conveyor belts 11 are driven by the common drive shaft 18.

Positioned beneath the upper runs of the conveyor belts 11 are endless support belts 19, arranged in pairs one on either side of a cutting knife 14, trained around a common drive shaft 20. The support belt units are supported by a non-rotating shaft 21. The support belts 19 are provided with side frames 22 each of which has a contact surface 23 on the side facing the knife 14. A support plate 24 is positioned beneath the upper runs of the conveyor belts 11 to cover the gaps between the belts to prevent the fish pieces from falling through.

The movement of the cutting knives is effected by pulse motors 25 with pistons 26 attached to arms 27 having forked ends 27a which slide in circumferential grooves 28 in rings 29 bolted to the cutting knives 14 around the drive shaft 15. The ultrasonic sensors 17 are linked to the pulse motors 25 by a computer (not shown).

In operation, the loin 10 travels along the conveyor belts 11 where the ultrasonic sensors 17 measure the belt speed, the length and the thickness at several points over the fish surface. This information is fed to the computer which calculates the section area and, by interpolating data from adjacent sensors, calculates the conicity of the loin. By multiplying the section area by the length, the computer calculates the volume of each piece to be cut.

The computer is preprogrammed with data relating to the specific gravity and the desired weight for each portion to be cut and, by means of all this information, calculates the length needed for a given piece weight and actuates the pulse motors 25 which move the cutting knives 14 into the correct cutting position to cut the required size of chunk. When a pulse motor is actuated, its piston 26 moves the arm 27, the lower forked end of which 27a is fitted into the groove 28 of the ring 29, which in turn causes the ring 29 and the cutting knife 14 to slide the appropriate distance in the appropriate direction on the drive shaft 15 so that the lower cutting edge, which protrudes through the gap 13 between two conveyor belts 11 supported by the side frames 22 and contact surface 23 of the support belts 19, is in the correct cutting position to cut the loin into chunks of the desired weight. The chunks may afterwards be graded according to their weights or further processed.

Referring to FIGS. 3 and 4, frozen fish fillets 30 travel transversely on a conveyor belt 31 in the direction of the arrows beneath ultrasonic sensors 32. After measurement of the volume of the ultrasonic sensors, the fish fillets are oriented so that they are positioned longitudinally to the direction of motion of the conveyor belt for cutting. In FIG. 3, this is achieved by a turning pin 33 mounted above the belt in a fixed position. The fillets are turned by contact with the pin as they travel along the belt after which the fish fillets are transferred to an infeed belt 34 to the cutting unit 35 which is a vertically reciprocating circular saw or stamp with sharp edges. In FIG. 4, the fish fillets are oriented by means of a pusher 36 which pushes them onto the infeed belt 37 to the cutting unit 38, which is a vertically reciprocating circular saw or stamp with sharp edges, and after cutting, to the outfeed belt 39. The information on the volume of the fish fillets is fed from the ultrasonic sensors to a computer which actuates a pulse motor (not shown) to stop and start the infeed belt 34,37 so that it travels intermittently the appropriate distance to ensure that the correct length of each fillet is cut equivalent to the desired weight. The fillets are then transported away on the outfeed belt 39 for further processing.

FIGS. 7 and 8 illustrate alternate methods of measuring thickness at a point over the fish surface by a sensor.

In FIG. 7, the fish piece 10 travels along the conveyor belts 11 below the sensor 17 which measures the reflection through air from the surface to give the distance a. Since the distance b is known, the thickness is b-a.

In FIG. 8, the fish piece 10 first travels along conveyor belts 40 and then is transferred to conveyor belts 41. As the fish piece crosses the gap between the two sets of succeeding conveyor belts, it passes beneath a pressure roller 42 and contacts sensor 17 which is positioned in the gap below the fish piece. The sensor 17, in this case, measures the reflection through the fish piece to give the thickness a.

I claim:

1. An apparatus for cutting a foodstuff comprising:
   a conveyor for transporting a foodstuff;
   a cutting device positioned with respect to the conveyor for cutting a foodstuff transported by the conveyor;
   an ultrasonic measuring device positioned with respect to the conveyor and cutting device for taking foodstuff length and thickness information from the foodstuff transported by the conveyor to the cutting device; and
   a control unit for receiving and processing the information taken by the ultrasonic measuring device to position the cutting device based on the processed information and to actuate cutting the transported foodstuff into measured portions.

2. An apparatus according to claim 1 wherein the control device is preprogrammed with a specific gravity of the foodstuff and with a weight of a portion of the foodstuff to be cut for processing with the information taken by the ultrasonic measuring device.

3. An apparatus according to claim 2 wherein the ultrasonic measuring device further takes information on a speed at which the transported foodstuff is transported.

4. An apparatus according to claim 1 wherein the ultrasonic measuring device further takes information on a speed at which the transported foodstuff is transported.

5. An apparatus according to claim 1 wherein the conveyor comprises a plurality of adjacent parallel belts having a gap between each adjacent belt and wherein the cutting device has a plurality of cutting edges wherein each cutting edge is positioned in a gap between adjacent belts and is movable laterally in the gap between the adjacent belts.

6. An apparatus according to claim 1 wherein the cutting device has at least one cutting edge positioned transverse to a direction of movement of the conveyor.

7. A process for cutting a foodstuff comprising transporting a foodstuff on a conveyor to a cutting device past an ultrasonic measuring device, taking foodstuff length and thickness information from the foodstuff with the ultrasonic measuring device from the foodstuff transported by the conveyor to the cutting device, feeding the information taken by the ultrasonic measuring device to a control unit, processing the information in the control unit to position the cutting device based on the processed information and to actuate cutting the foodstuff into measured portions.

8. A process according to claim 7 wherein the control device is preprogrammed with a specific gravity of the foodstuff and with a weight of a portion of the foodstuff to be cut for processing with the information taken by the ultrasonic measuring device.

9. A process according to claim 8 further comprising taking information with the ultrasonic measuring device on a speed at which the transported foodstuff is transported.

10. A process according to claim 7 further comprising taking information with the ultrasonic measuring device on a speed at which the transported foodstuff is transported.

* * * * *